United States Patent
Rothman et al.

(10) Patent No.: US 7,302,593 B2
(45) Date of Patent: Nov. 27, 2007

(54) METHOD FOR REMOTELY QUERYING A BLADE SERVER'S PHYSICAL LOCATION WITHIN A RACK OF BLADE SERVERS

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/742,333

(22) Filed: Dec. 18, 2003

(65) Prior Publication Data

US 2005/0138439 A1    Jun. 23, 2005

(51) Int. Cl.
 *G06F 1/00* (2006.01)

(52) U.S. Cl. ............... 713/300; 713/320; 713/340
(58) Field of Classification Search ........... 713/300, 713/310, 340, 320
See application file for complete search history.

(56) References Cited

U.S. PATENT DOCUMENTS

| | | | |
|---|---|---|---|
| 6,504,605 B1* | 1/2003 | Pedersen et al. | 356/141.1 |
| 6,850,839 B1* | 2/2005 | McGibney | 701/207 |
| 2003/0046339 A1* | 3/2003 | Ip | 709/203 |
| 2004/0199698 A1* | 10/2004 | Bolian et al. | 710/305 |
| 2004/0257998 A1* | 12/2004 | Chu et al. | 370/252 |
| 2005/0060088 A1* | 3/2005 | Helal et al. | 701/208 |
| 2005/0060387 A1* | 3/2005 | Lee | 709/220 |
| 2005/0160450 A1* | 7/2005 | Stephens et al. | 725/35 |

* cited by examiner

*Primary Examiner*—Thomas Lee
*Assistant Examiner*—Malcolm D Cribbs
(74) *Attorney, Agent, or Firm*—Blakely, Sokoloff, Taylor & Zafman LLP

(57) ABSTRACT

A system and method to determine a physical location of a blade server. In one embodiment, electromagnetic fields are from at least two electromagnetic sources are radiated. The two electromagnetic sources are mounted on a rack of blade servers. Power levels of the electromagnetic fields are measured to triangulate a physical location of the blade server within the rack of blade servers.

27 Claims, 6 Drawing Sheets

```
typedef struct{
      UNINT32    RackID;
      UNINT32    X-Coordinate;
      UNINT32    Y-Coordinate;
}            SERVER_LOCATION_ID;
```

FIG. 6

1. IP ADDR/MAC ADDR: PHYS. LOCATION
2. IP ADDR/MAC ADDR: PHYS. LOCATION
3. IP ADDR/MAC ADDR: PHYS. LOCATION
4. IP ADDR/MAC ADDR: PHYS. LOCATION
5. IP ADDR/MAC ADDR: PHYS. LOCATION
...
N. IP ADDR/MAC ADDR: PHYS. LOCATION

FIG. 7

METHOD FOR REMOTELY QUERYING A BLADE SERVER'S PHYSICAL LOCATION WITHIN A RACK OF BLADE SERVERS

TECHNICAL FIELD

This disclosure relates generally to blade servers, and in particular but not exclusively, relates to locating the physical location of a particular blade server among many blade servers.

BACKGROUND INFORMATION

Network servers are becoming increasingly important to large enterprises to manage networks, host data, and otherwise execute a wide variety of networking tasks. As such, large enterprises may have hundreds, if not thousands, of blade servers mounted in racks to support these networking tasks. In fact, large enterprises may have rooms dedicated to housing racks of blade servers in buildings strewn throughout a country or even the world.

When one of these blade servers malfunctions a network operator can often determine an internet protocol ("IP") address or media access control ("MAC") address of the malfunctioning or non-responsive blade server. If the problem can be solved remotely over a network, the network operator can fix the blade server without physically locating it. If the problem is such that the blade server must be physically manhandled to remedy the malfunction, the problematic blade server must be located.

However, correlating an IP address or MAC address to the physical blade server can be a problem in and of itself. In fact, in large enterprise settings where entire rooms or even buildings are dedicated to housing racks of blade servers, finding the physical location of a blade server can be like finding the proverbial needle in a haystack. Even once the rack containing the malfunctioning blade server has been tracked down, locating the particular blade server within the rack can present yet another problem.

Modern racks can house more than 70 individual blade servers per rack in a dense, compact form factor. If a technician is lucky, the malfunctioning blade server "may" have a blinking light or other form of visual indicators. However, such visual indicators may not be present, not triggered by the particular malfunction, or even malfunctioning themselves. Thus, locating the physical location of a malfunctioning or even non-malfunctioning blade server can be a task in and of itself, a waste of time and resources, and simply a headache for the individual on whom the task is bestowed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a diagram illustrating one possible network ID packet, in accordance with an embodiment of the present invention.

FIG. 7 is a diagram illustrating a master list containing physical locations of many blade servers from many different racks, in accordance with an embodiment of the present invention.

DETAILED DESCRIPTION

Embodiments of a system and method for triangulating the physical location of a blade server within a rack of blade servers and communicating this physical location to remote users are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figures 1A, 1B:
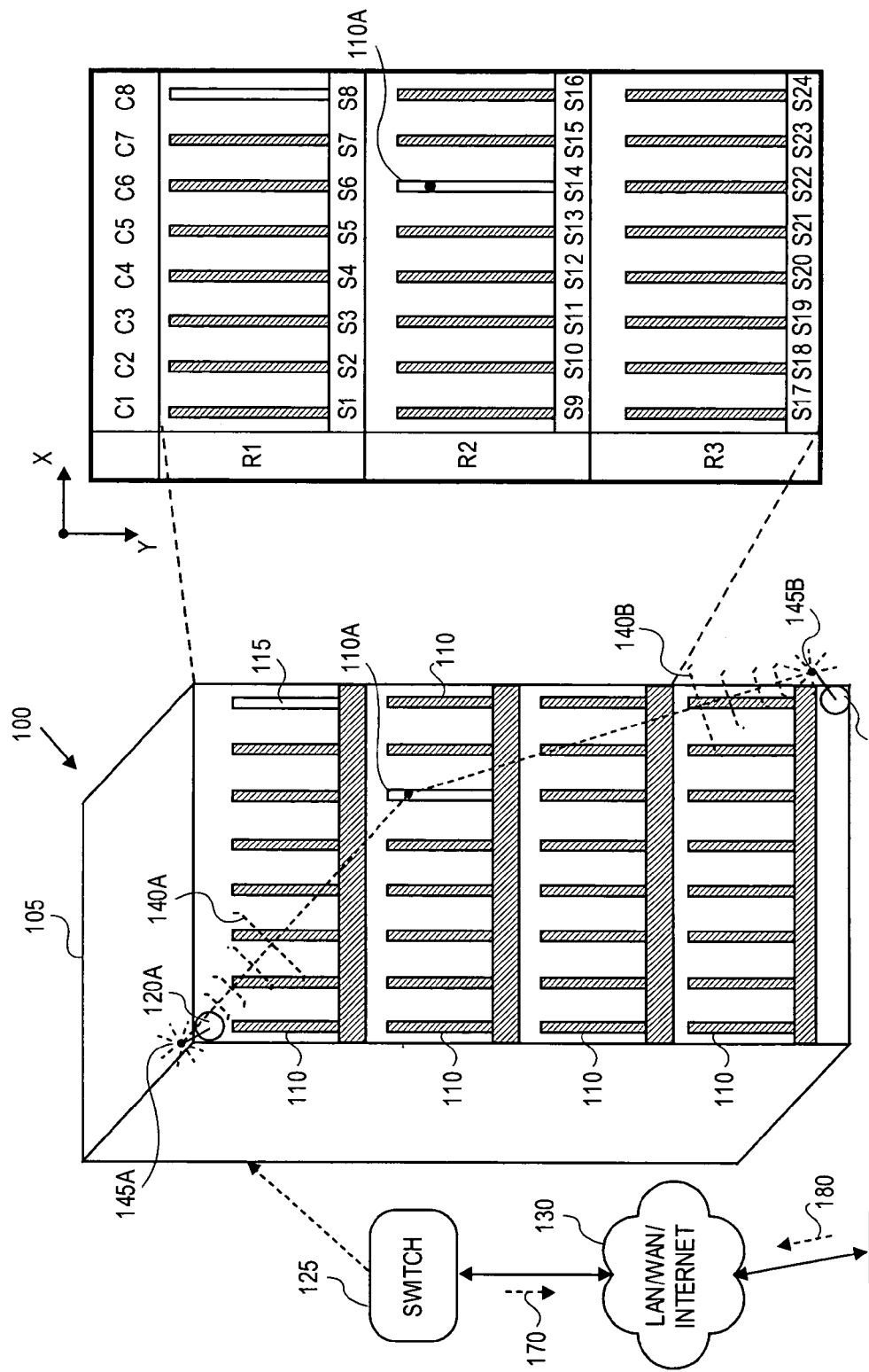
FIG. 1A is a diagram illustrating a rack of blade servers, in accordance with an embodiment of the present invention.
FIG. 1B is an expanded view of a rack of blade servers illustrating how the individual blade servers are mounted in an array like pattern, in accordance with an embodiment of the present invention.

FIG. 1A is a diagram illustrating a rack of blade servers 100, in accordance with an embodiment of the present invention. The illustrated embodiment of rack of blade servers 100 includes a chassis 105, blade servers 110, a management module 115, chassis transceivers 120A and 120B, and a switch 125.

The components of rack of blade servers 100 are interconnected as follows. Typically, blade servers 110 are mounted via edge connectors into slots organized in an array fashion within chassis 105. When the edge connector of one of blade servers 110 is inserted into one of the slots of chassis 105, power is delivered to the particular blade server 110. In one embodiment, blade servers 110 are further communicatively coupled via an out-of-band ("OOB") channel to management module 115. Blade servers 110 are further coupled to a network 130 via switch 125.

Typically, management module 115 is an independent hardware module with dedicated firmware to perform management functions, such as for example, coordinating arbitration and allocation of shared resources between blade servers 110, logging system errors, coordinating fault resilient booting of blade server 110, fan control, power supply monitoring and regulation, and the like. Generally, management module 115 controls switch 125 and is able to grant or deny each of blade servers 110 access to network 130. Further, management module 115 has a known internet protocol ("IP") address which can be accessed by a remote user (e.g., network operator) via network 130.

In one embodiment, management module 115 is a Unified Management Module ("UMM"). From a hardware perspective, a UMM may be similar or identical to blade servers 110; however, the UMM includes specialized firmware and/or software for conducting management functions. In yet another embodiment, management module 115 may be a chassis management module ("CMM") mounted to chassis 105 (not illustrated). A CMM performs similar functions to a UMM.

In the illustrated embodiment of rack of blade servers 100, blade servers 110 are illustrated as being vertically mounted in rows. However, it should be appreciated that the illustrated embodiment of rack of blade servers 100 is only one possible embodiment. Other possible embodiments include blade servers 110 mounted horizontally in columns, or various other efficient configurations.

Rack of blade servers 100 further includes chassis transceivers 120 for triangulating a physical location of each of blade servers 100 (illustrated as currently triangulating the physical location of blade server 110A). In one embodiment, chassis transceivers 120A and 120B emit electromagnetic ("EM") radiation, in the form of EM fields 140A and 140B, respectively, outward from antennas 145A and 145B. An antenna mounted on each of blade servers 110 receives this EM radiation, measures the received power levels, and triangulates its physical location within chassis 105 based on the received power levels. Thus, embodiments of the present invention need at least two chassis transceivers 120 mounted in physically distinct locations around rack of blade servers 110 to enable triangulation of blade servers 110. Although only two chassis transceivers 120 are illustrated as mounted in diagonal corners of chassis 105, embodiments of the present invention may include three or more chassis transceivers 120 mounted in various other locations to increase the granularity or resolution at which the physical locations may be triangulated.

FIG. 1B is an expanded view of a portion of rack of blade servers 100 illustrating how the individual blade servers 110 are mounted in an array like pattern. As can be seen, blade server 110A is mounted into a slot S14 of chassis 105. Slot S14 has a unique x-y coordinate or row-column position—(C6, R2). Such is the case for all blade servers 110. Knowledge of the x-y coordinate (or row-column position) can be easily translated into a slot position using a lookup table or other heuristic. Further, knowing a slot position or row-column position can facilitate a quick location of a particular blade server 110 (such as blade server 110A) by a technician dispatched to find a malfunctioning blade server.

Figure 2:
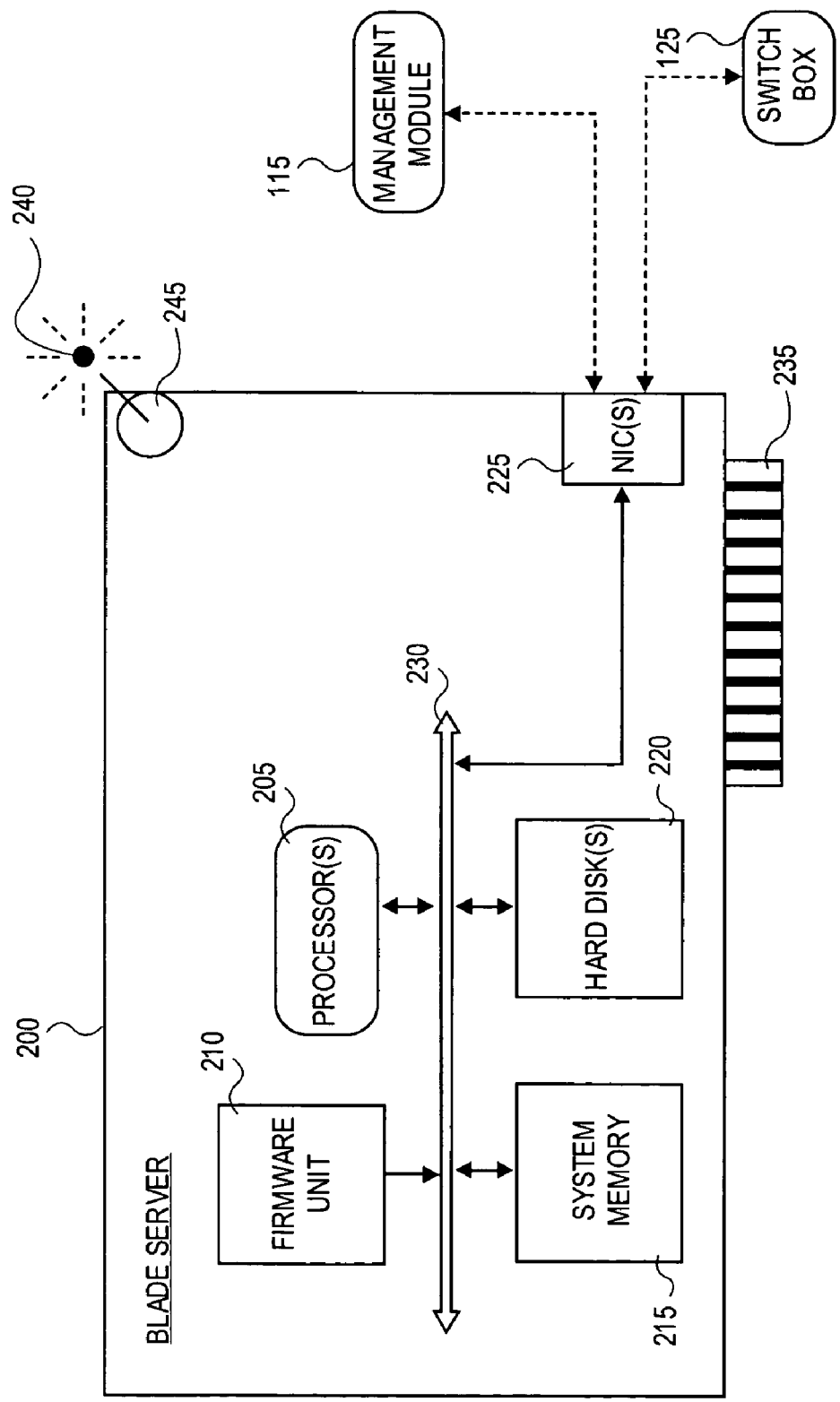
FIG. 2 is a block diagram illustrating a blade server having an electromagnetic antenna for triangulating the physical location of the blade server, in accordance with an embodiment of the present invention.

FIG. 2 is a block diagram illustrating blade server 200, in accordance with an embodiment of the present invention. The illustrated embodiment of blade server 200 represents one embodiment of blade servers 110. The illustrated embodiment of blade server 200 includes one or more processor(s) 205, a firmware unit 210, system memory 215, one or more hard disk(s) 220, one or more network interface card(s) ("NICs") 225, a system bus 230, an edge connector 235, an antenna 240, and a transceiver 245. Blade server 200 may also optionally include an analog-to-digital converter (not illustrated) to convert a received EM field to a digital signal for manipulation and processing by processor(s) 205.

The elements of blade server 200 are interconnected as follows. Processor(s) 205 are communicatively coupled to firmware unit 210, system memory 215, hard disk(s) 220, and NIC(s) 225 via system bus 230 to send and to received instructions thereto/therefrom. In one embodiment, firmware unit 210 is a flash memory device. In other embodiments, firmware unit 210 includes any one of read only memory ("ROM"), programmable ROM, erasable programmable ROM, electrically erasable programmable ROM, or the like. In one embodiment, system memory 215 includes random access memory ("RAM"). Hard disk(s) 220 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

When blade server 200 is mounted into chassis 105, edge connector 235 mates with an input/output ("I/O") slot of chassis 105. Upon insertion, power is delivered to blade server 200, which enters a setup phase or pre-boot runtime. Edge connection 235 also couples blade server 200 to management module 115 via the OOB channel and to network 130 via switch 125. During the setup phase, blade server 200 negotiates access to network 130 with management module 115.

It should be appreciated that various other elements of blade server 200 have been excluded from FIG. 2 and this discussion for the purposes of clarity. For example, system bus 230 may represent several buses (including a peripheral interconnect bus) interconnected via subcomponents, such as a memory controller hub and an input/output ("I/O") controller hub. Furthermore, the illustrated embodiment of blade server 200 is only one possible embodiment of blade server 200. One of ordinary skill in the art having the benefit of the present disclosure will understand various modifications to the architecture of blade server 200 may be implemented.

Figure 3:
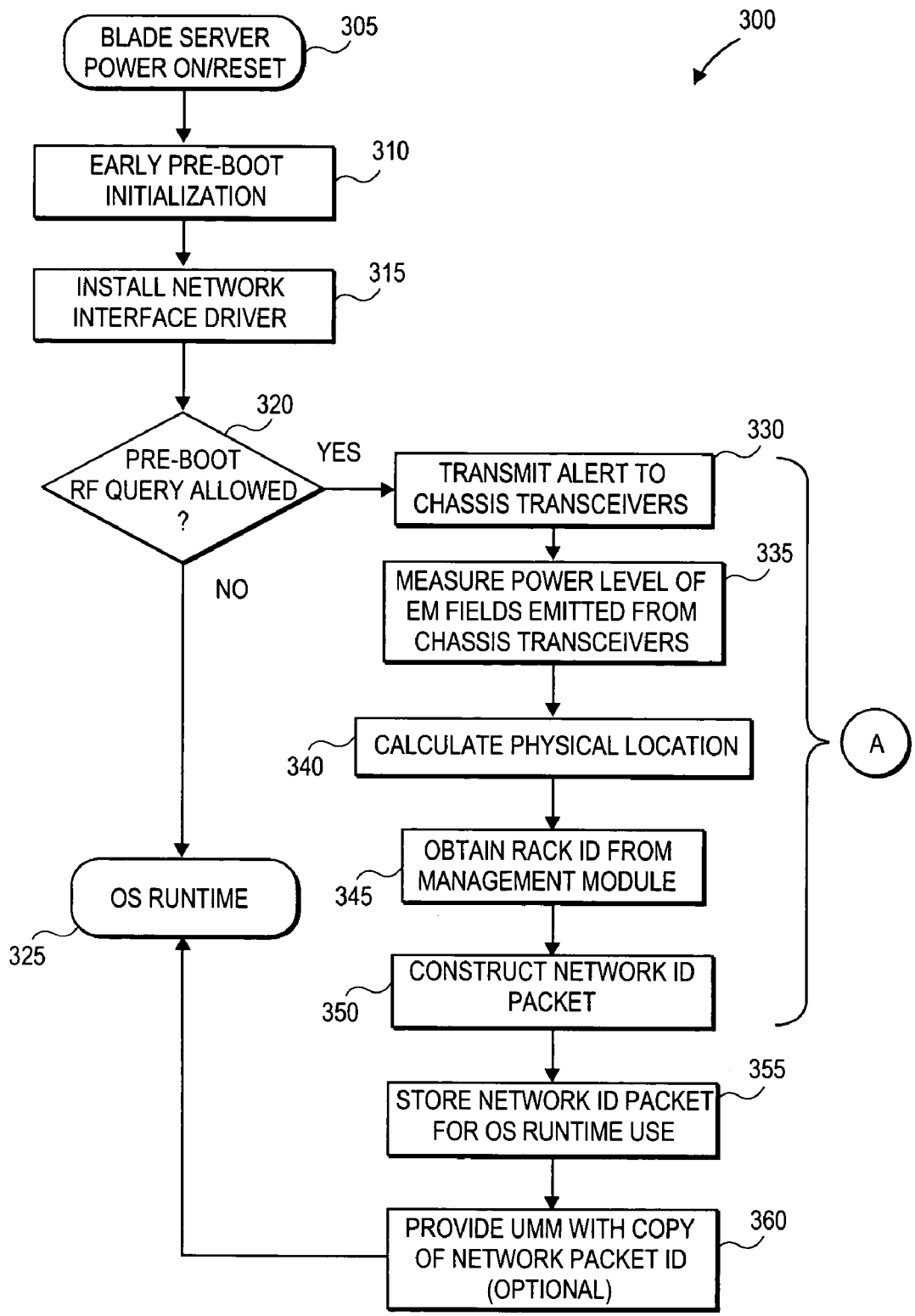
FIG. 3 is a flow chart illustrating a process for triangulating a physical location of a blade server and generating a network ID packet containing the physical location, in accordance with an embodiment of the present invention.

FIG. 3 is a flow chart illustrating a process 300 for triangulating a physical location of a blade server (e.g., blade server 110A) and generating a network ID packet containing the physical location, in accordance with an embodiment of the present invention.

In a process block 305, blade server 110A is powered on, power cycled, or otherwise reset. A power on event may result from inserting blade server 110A into slot S14 of chassis 105. In a process block 310, once power is delivered to blade server 110A, blade server 110A commences an early pre-boot initialization. The early pre-boot initialization may include hardware discovery and initialization (e.g., enumerating system bus 230, discovering & initializing system memory 215), a power on self-test ("POST"), and other pre-operating system load activities.

Continuing to a process block 315, a network interface driver is installed to enable communications over the OOB channel and/or network 130. In one embodiment, the network interface driver includes a universal network driver interface ("UNDI"). The UNDI is an architectural interface to network interface cards ("NICs"). In other legacy embodiments, custom network interfaces and custom drivers may be loaded to effect networked communications.

In a decision block 320, it is determined whether there is sufficient time during the boot-up phase or pre-boot runtime of blade server 110A to execute a location query. In most cases, there will be sufficient time to execute a location query during the pre-boot runtime of blade server 110A or it is acceptable to prolong the boot-up time to execute a pre-boot location query. Whether or not to execute the location query during the pre-boot runtime of blade server 10A is a policy decision, which may be preset by the network operator.

It should be noted that prolonging the pre-boot runtime of blade servers 110 is not considered as undesirable as it is for workstations, desktop computers, or notebook computers. In the latter cases, these non-server computing systems are regularly reboot or reset once a day and often times several time a day. Each time, a user of the non-server computing system must patiently (or impatiently as the case may be) wait. In contrast, blade servers 110 (or most servers in general) are seldom power cycles or reset. Thus, increasing the pre-boot runtime is less of an issue.

If it is determined that there is not sufficient time during the pre-boot runtime to execute a location query or the policy has been set to skip a pre-boot location query, then process 300 continues to a process block 325. In process block 325, blade server 110A has completed the pre-boot runtime, loaded an operating system ("OS"), and begun OS runtime execution.

Returning to decision block 320, if it is determined that there is sufficient time during the pre-boot to execute a location query or the policy has been set to execute a pre-boot location query, then process 300 continues to a process block 330. In process block 330, blade server 110A transmits an alert to indicate to chassis transceivers 120 and/or management module 115 that blade server 110A is ready to execute a location query. Transmission of the alert may be executed a number of different ways.

In one embodiment, the alert is transmitted by blade server 110A to transceivers 120 via a radio frequency ("RF") signal transmitted via transceiver 245 and antenna 240 of blade server 110A. In this RF alert embodiment, the RF alert may be a short identifiable pulse. Upon reception of the RF alert, chassis transceivers 120 respond by broadcasting EM fields 140. In one embodiment, transceivers 120 time stagger their transmissions so that blade server 110A can individually measure the power levels of each EM field 140 (in a process block 335 described below). In another embodiment, each of EM fields 140 are radiated at different frequencies. Radiating each of EM fields 140 at different frequencies enables blade server 110A to distinguish EM field 140A from EM field 140B and thereby transmission of EM fields 140 may occur simultaneously or partially overlap.

In another embodiment, the alert is transmitted to transceivers 120 via an OOB hardwired channel. For example, the alert could be communicated to management module 115 via the OOB channel. In response, management module 115 would indicate to transceivers 120 to commence transmission of the EM fields 140. It should be appreciated that embodiments of this non-RF alert do not require that transceivers 120 and 245 be capable of both transmit and receive functionality. Rather, transceivers 120 may be simple EM sources 120 and transceiver 245 may be a simple EM receiver 245.

One of ordinary skill having the benefit of the present disclosure will appreciate that the alert need not be limited to RF frequencies, rather microwave frequencies or even infrared, visual, or ultraviolet frequencies may be used. In the embodiments where infrared, visual, or ultraviolet radiation is emitted, antennas 145 and 245 would have to be aligned, or reflective surfaces used, such that a light of sight is achieved between the antennas.

In a process block 335, antennas 120 emit EM fields 140 for blade server 110A to receive and measure. EM fields 140 are received by antenna 240 and transceiver 245. Once received, blade server 110A measures the power levels of each of EM fields 140. It should be appreciated that embodiments of blade server 110A may include a digital-to-analog converter (not shown in FIG. 2) for converting the measured power levels to digital values.

Figure 4:
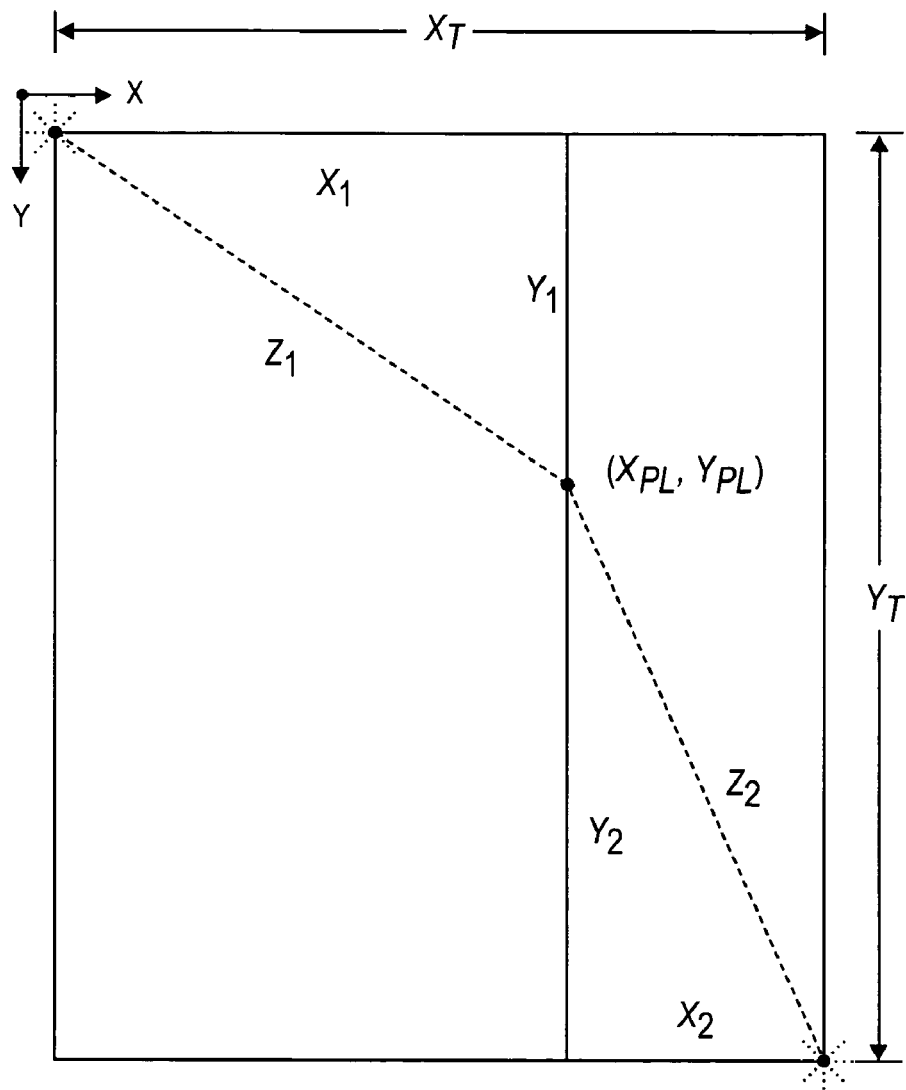
FIG. 4 is a diagram illustrating a technique for triangulating a physical location of a blade server within a rack of blade servers, in accordance with an embodiment of the present invention.

In one embodiment, once the power levels of each of EM fields 140 have been measured, blade server 110A calculates its physical location within chassis 105 via triangulation (process block 340). Referring to FIG. 4, one technique for triangulating the physical location of blade server 110A is illustrated, in accordance with an embodiment of the present invention. Coordinates $(X_{PL}, Y_{PL})$ represent the physical location of antenna 240 of blade server 110A in an x-y coordinate system.

Using the measured power levels of EM fields 140A and 140B, blade server 110A can calculate lengths $Z_1$ and $Z_2$, respectively, via application of Relation 1:

$$PowerLevel = \frac{Power_{TX} \cdot Gain_{TX} \cdot Gain_{TX} \cdot Gain_{RX} \cdot \lambda^2}{(4\pi Z)^2} \quad \text{Relation (1)}$$

where $Power_{TX}$ is the input power to antennas 145A or 145B, $Gain_{TX}$ is the gain of antennas 145A or 145B, $Gain_{Rx}$ is the gain of antenna 240, $\lambda$ is the wavelength of EM fields 140A or 140B, and Z corresponds to one of lengths $Z_1$ or $Z_2$. Therefore, lengths $Z_1$ and $Z_2$ are determinable values based on the measured power levels of EM fields 140. Lengths $X_T$ and $Y_T$ are known values since they correspond to the static physical placement of antennas 120A and 120B on chassis 105. Thus, referring to equations 405, there are four unknowns (e.g., $X_1$, $Y_1$, $X_2$, $Y_2$) and four equations 405. Plugging in the known values 410 (i.e., $X_T$, $Y_T$, and $Z_1$, $Z_2$, determined from Relation 1), all four equations 405 can be solved. As can be seen from FIG. 4, $X_1 = X_{PL}$ and $Y_1 = Y_{PL}$. Thus, the x-y coordinates of blade server 110A can be triangulated from the measured power levels of EM fields 140A and 140B. It should be appreciated that while only two EM sources are necessary to triangulate blade server 110A, additional EM sources could be used to resolve the physical location of blade server 110A with greater granularity or resolution.

Once x-y coordinates have been obtained, blade server 110A may translate the x-y coordinates $(X_{PL}, Y_{PL})$ into row-column coordinates, illustrated in FIG. 1B. For example, blade server 110A may contain a look-up table, which relates x-y coordinates $(X_{PL}, Y_{PL})$ to row-column coordinates. In yet another embodiment, blade server 110A may translate the x-y coordinates $(X_{PL}, Y_{PL})$ to a slot number. In the case of blade server 110A, x-y coordinates $(X_{PL}, Y_{PL})$ would translate to row-column coordinates (R2, C6) and slot number S14. Other heuristics or techniques may be employed to translate x-y coordinates to row-column coordinates and/or a slot number.

In a process block 345, blade server 110A communicates with management module 115 via the OOB channel to obtain a rack identification ("ID") for rack of blade servers 100. The rack ID uniquely identifies rack of blade servers 100 from other racks of blade servers. In one embodiment, the rack ID is a serial number or the like that can be correlated to one or more of an address, building number, room number, an aisle number, and a rack number. In one embodiment, the rack ID may actually include one or more of the address, the building number, the room number, the aisle number, and the rack number. Thus, the rack ID includes information that may be used by a technician to locate the exact physical location of rack of blade servers 110A.

In a process block 350, blade server 110A constructs a network ID packet 170 (see FIG. 1A). Network ID packet 170 includes the information to aid a technician in locating blade server 110A. In one embodiment, network ID packet 170 includes the slot number and the rack ID. In one embodiment, network ID packet 170 includes the row-column coordinate and the rack ID. In yet another embodiment, network ID packet 170 includes the x-y coordinates ($X_{PL}$, $Y_{PL}$) and the rack ID. FIG. 6 illustrates one possible embodiment of network ID packet 170.

Returning to FIG. 3, in a process block 355, blade server 110A stores the generated network ID packet 170 to a memory location within blade server 110A so that network ID packet 170 may be accessed during the OS runtime of blade server 110A. In one embodiment, network ID packet 170 is stored to a Secondary System Description Table ("SSDT"), as defined by an Advance Configuration and Power Interface ("ACPI") specification, such as the ACPI Specification, Revision 2.0a, Mar. 31, 2002 (ACPI specifications are available at www.acpi.info). The SSDT is a continuation of a Differentiated System Description Table ("DSDT"). The DSDT supplies implementation and configuration information about a base system.

In yet another embodiment, network ID packet 170 is stored to an Extensible Firmware Interface ("EFI") configuration table of an EFI compliant system (specifications of which may be found at http://www.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., see FIG. 2, firmware unit 210). More particularly, EFI enables firmware, in the form of firmware modules and drivers, to be loaded from a variety of different resources, including primary and secondary flash devices, ROMs, various persistent storage devices (e.g., hard disks, CD ROMs, etc.), and even over computer networks.

Returning to process 300 illustrated in FIG. 3, in a process block 360 blade server 110A transmits network ID packet 170 to management module 115. The transmission of network ID packet 170 may occur over the OOB channel. Providing management module 115 with a copy of network ID packet 115 enables management module 115 to transmit network ID packet 170 over network 130, in response to a location query 180 from a remote user. Providing management module 115 with a copy of network ID packet 170 provides failsafe redundancy for locating a crashed one of blade servers 110, which may be unable to convey its physical location. As illustrated in FIG. 3, process block 360 is an optional block and need only be executed if failsafe redundancy is desired.

Once network ID packet 170 has been generated and copies stored within memory of blade server 110A and/or management module 115, process 300 continues to process block 325. As described above, blade server 110A enters the OS runtime in process block 325.

Figure 5:
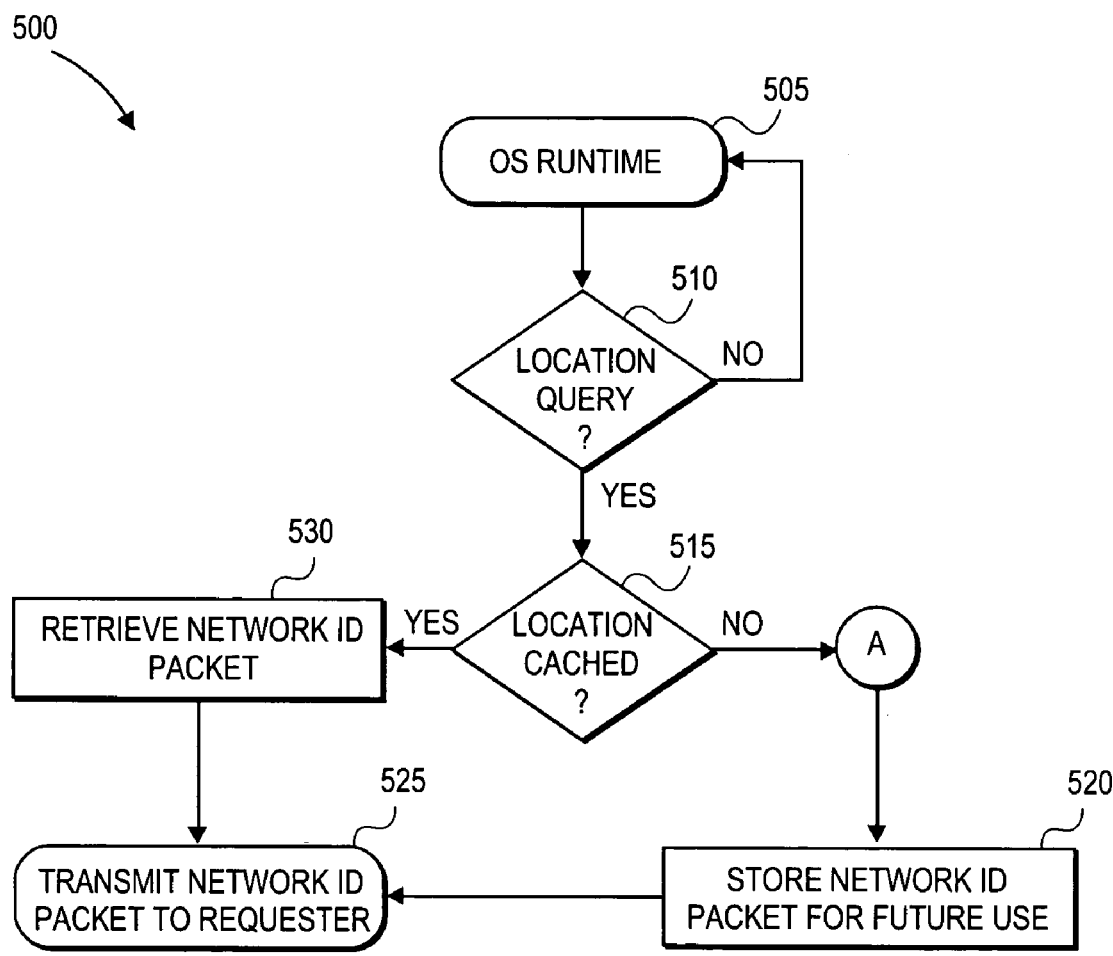
FIG. 5 is a flow chart illustrating a process for responding to remote location queries of a blade server, in accordance with an embodiment of the present invention.

FIG. 5 is a flow chart illustrating a process 500 for responding to location queries 180 (see FIG. 1A) for the physical location of blade server 110A, in accordance with an embodiment of the present invention. It should be appreciated that blade server 110A is only representative and embodiments processes 300 and 500 are equally applicable to any of blade servers 110.

In a process block 505, blade server 110A is executing within OS runtime. In a decision block 510, when blade server 110A receives location query 180 via network 130, process 500 continues to a decision block 515. In decision block 515, blade server 110A determines whether network ID packet 170 is already cached (e.g., stored within an SSDT, EFI configuration table, or the like). If network ID packet 170 has not yet been generated and therefore not cached, then process 500 continues to process block "A." Process block A incorporates process blocks 330 to 350 of process 300. Thus, blade server 110A re-executes process blocks 330 to 350 of process 300 to determine its physical location and generate a network ID packet.

Once network ID packet 170 has been generated, process 500 continues to a process block 520. In process block 520, blade server 110A saves a copy of network ID packet 170 to a memory location (e.g., ACPI SSDT, EFI configuration table, or the like) for future use. In a process block 525, blade server 110A transmits network ID packet 170 to the remote user over network 130.

Returning to decision block 515, if network ID packet 170 is cached (e.g., within an SSDT, an EFI configuration table, or the like), then process 500 continues to a process block 530. In process block 530, blade server 110A retrieves network ID packet 170 from memory and transmits network ID packet 170 in process block 525.

It should be appreciated that process 500 has just been described with reference to one of blade servers 100. However, process 500 is also applicable to management module 115. If management module 115 was provided with a copy of network ID packet 170 in optional processing block 360 (FIG. 3), then management module 115 is capable of receiving location query 180 and transmitting network ID packet 170 in place of blade server 110A. As mentioned above, enabling management module 115 to receive and respond to location queries of blade servers 110 builds in failsafe redundancy. Furthermore, the IP address of management module 115 is well known to a system operator and easily locatable. Thus, a network operator (e.g., the remote user) can easily find and access management module 115 over network 130 and issue location queries for one of blade servers 110 to management module 115.

FIG. 7 is a diagram illustrating a master list 700 containing physical locations of many blade servers, in accordance with an embodiment of the present invention. As illustrated, master list 700 correlates a unique identifier of each blade server to its physical location. In one embodiment, the unique identifier is an IP address. In another embodiment, the unique identifier is a media access control ("MAC") address.

In one embodiment, master list 700 contains network ID packets corresponding to all of blade servers 110 within rack of blade servers 100. In this embodiment, management module 115 collects a network ID packet from each of blade servers 110 into master list 700. In an alternative embodiment, master list 700 contains network ID packets corresponding to blade servers from multiple racks distributed throughout a room, building, or even an entire corporation. Thus, in the alternative embodiment, management modules from many racks each store a copy of master list 700 that contains the physical locations of all blade servers on a network. Sharing master list 700 between multiple management modules provides further failsafe redundancy by enabling any one of the management modules to respond to location queries from a remote user for any registered blade server.

While specific embodiments of, and examples for, the invention are described herein for illustrative purposes, various equivalent modifications are possible within the scope of the invention, as those skilled in the relevant art will recognize. These modifications can be made to the embodiments described herein in light of the above detailed description. For example, embodiments of the present invention may be modified such that blade servers 110 broadcast an EM field upon being inserted into a slot of chassis 105. Power levels of the broadcasted EM field can be measured by chassis transceivers 120 under the control of management module 115. Once management module 115 has obtained the measured power levels, management module 115 can then triangulate the physical location of the inserted blade server and register the physical location in master list 700. In this modified embodiment, blade servers 110 need only have an EM source and chassis transceivers 120 can be replaced with EM receivers.

The above description of illustrated embodiments of the invention, including what is described in the Abstract, is not intended to be exhaustive or to limit the invention to the precise forms disclosed. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    radiating electromagnetic fields from at least two electromagnetic sources mounted on a rack of blade servers;
    measuring power levels of the electromagnetic fields to triangulate a physical location of a blade server within the rack of blade servers; and
    communicating the physical location to a management module of the rack of blade servers so that the management module can respond to queries for the physical location of the blade server via the network.

2. The method of claim 1, further comprising calculating one of a row-column location and a slot location based on the measured power levels of each of the electromagnetic fields.

3. The method of claim 1 wherein radiating the electromagnetic fields comprises radiating each of the electromagnetic fields during staggered non-overlapping time periods.

4. The method of claim 1 wherein each of the electromagnetic fields is radiated with a different frequency so as to be distinguishable from each other.

5. The method of claim 1, further comprising generating a network ID packet containing the physical location of the blade server.

6. The method of claim 5, further comprising transmitting the network ID packet over a network to a remote requester in response to a request for the physical location of the blade server via the network.

7. The method of claim 5, wherein radiating the electromagnetic fields, measuring the power levels, and generating the network ID packet occur during a pre-boot runtime of the blade server.

8. The method of claim 7, further comprising storing the network ID packet to a memory location on the blade server for use during an OS runtime of the blade server.

9. The method of claim 8 wherein the memory location includes one of an Advanced Configuration and Power Interface ("ACPI") description table and an Extensible Firmware Interface ("EEI") configuration table.

10. The of claim 1, further comprising:
    sharing the network ID packet with other management modules of other racks of blade servers; and
    generating a master list containing network ID packets from a plurality of blade servers from multiple racks of blade servers.

11. The method, comprising:
    emitting electromagnetic radiation from a blade server mounted in a rack of blade servers;
    measuring power levels of the electromagnetic radiation with at least two receivers; and
    triangulating a physical location of the blade serve within the rack of blade servers based on the power levels measured by the receivers, wherein the emitting, the measuring, and the triangulating occur during a pre-boot runtime of the blade server.

12. The method of claim 11, further comprising:
    generating a network ID packet containing the physical location; and
    transmitting the network ID packet over a network.

13. The method of claim 12 wherein the network ID packet further contains a rack ID for locating the rack of blade servers.

14. A machine-accessible medium that provides instructions that, if executed by a blade server, will cause the blade server to perform operations comprising:
    measuring power levels of electromagnetic fields transmitted from at least two electromagnetic sources mounted to a rack of blade servers;
    triangulating a physical location of the blade server within the rack of blade servers based on the power levels of the electromagnetic fields measured; and
    generating a network ID packet containing the physical location of the blade server, wherein the measuring, the triangulating, and the generating are executable during a pre-boot runtime of the blade server.

15. The machine-accessible medium of claim 14, further providing instructions that, if executed by the blade server, will cause the blade server to perform operations, comprising:
    calculating one of a row-column location and a slot location based on the physical location triangulated.

16. The machine-accessible medium of claim 14, further providing instructions that, if executed by the blade server, will cause the blade server to perform operations, comprising: transmitting the network ID packet over a network to a remote requester in response to a request for the physical location of the blade server via the network.

17. The machine-accessible medium of claim 14, further providing instructions that, if executed by the blade server, will cause the blade server to perform operations, comprising: communicating with a management module of the rack of blade servers to obtain a rack location ID to add to the network ID packet.

18. The machine-accessible medium of claim 14, further providing instructions that, if executed by the blade server, will cause the blade server to perform operations, comprising:
    communicating the physical location of the blade server to a management module of the rack of blade servers.

19. The machine-accessible medium of claim 14, further providing instructions that, if executed by the blade server, will cause the blade server to perform operations, comprising:

transmitting a signal requesting transmission of the electromagnetic fields.

20. The machine-accessible medium of claim 19 wherein the signal is transmitted via an out-of-band connection to a management unit of the rack of blade server, the management unit triggering the electromagnetic sources to transmit the electromagnetic fields in response to the signal.

21. The machine-accessible medium of claim 19 wherein the signal is transmitted via an antenna to the electromagnetic sources.

22. A blade server, comprising:

an antenna to receive a plurality of electromagnetic fields from at least two electromagnetic source;

a transceiver communicatively coupled to the antenna to measure power levels of the electromagnetic fields; and a processor communicatively coupled to the transceiver, the processor to triangulate a physical location of the blade server based on the power levels of the electromagnetic fields, wherein the processor to request broadcast of the plurality of electromagnetic fields in response to the blade server being inserted into a slot of a rack of blade servers.

23. The blade server of claim 22, further comprising a network interface to couple to a network, the processor to generate a network ID packet containing the physical location of the blade server for transmission across the network.

24. A system, comprising:

a plurality of electromagnetic sources mounted to a rack of blade servers to generate a corresponding plurality of electromagnetic fields;

a plurality of blade servers mounted within the rack of blade servers, each of the plurality of blade servers including an antenna to receive the plurality of electromagnetic fields and to measure power levels of the plurality of electromagnetic fields to triangulate its physical location; and a management module communicatively coupled to each of the plurality of blade servers, each of the plurality of blade servers coupled to communicate its physical location to the management module, the management module configured to communicate one or more of the physical locations of the blade servers to a requester via a network.

25. The system of claim 24 wherein each of the plurality of blade servers is further to:

generate a network ID packet containing the physical location of the blade server; and transmit the network ID packet over a network in response to a request for the physical location of the blade server.

26. The system of claim 24 wherein each of the plurality of blade servers communicate its physical location to the management module during a pre-boot runtime of each of the plurality of blade servers.

27. The method of claim 6, further comprising communicating with a management module of the rack of blade servers to obtain a rack location ID to add to the network ID packet.

* * * * *